US009422053B2

(12) United States Patent
Himmelmann et al.

(10) Patent No.: US 9,422,053 B2
(45) Date of Patent: Aug. 23, 2016

(54) PASSIVE FAIL SAFE COUPLING MECHANISM

(71) Applicant: Hamilton Sundstrand Corporation, Windsor Locks, CT (US)

(72) Inventors: Richard A. Himmelmann, Beloit, WI (US); Steve William Tollefson, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 147 days.

(21) Appl. No.: 14/182,174

(22) Filed: Feb. 17, 2014

(65) Prior Publication Data
US 2015/0097077 A1   Apr. 9, 2015

Related U.S. Application Data

(60) Provisional application No. 61/888,760, filed on Oct. 9, 2013.

(51) Int. Cl.
*B64C 25/40* (2006.01)

(52) U.S. Cl.
CPC ............. *B64C 25/405* (2013.01); *Y02T 50/823* (2013.01)

(58) Field of Classification Search
CPC ........ B64C 25/32; B64C 25/34; B64C 25/36; B64C 25/405
See application file for complete search history.

(56) References Cited

U.S. PATENT DOCUMENTS

| 2,399,218 A | 4/1946 | Felburg |
| 2,507,440 A | 5/1950 | Hanson |
| 2,920,845 A * | 1/1960 | Palmiter .................... B64F 1/22 180/14.7 |
| 3,005,510 A * | 10/1961 | Phillips ................. B64C 25/405 180/14.7 |
| 3,269,786 A | 8/1966 | Diver et al. |
| 3,762,670 A | 10/1973 | Chillson |
| 4,500,143 A | 2/1985 | Kervistin et al. |
| 2005/0082427 A1* | 4/2005 | Seung ..................... B64C 25/16 244/102 R |
| 2007/0062169 A1 | 3/2007 | Busboom et al. |

(Continued)

FOREIGN PATENT DOCUMENTS

| EP | 2581306 A2 | 4/2013 |
| FR | 1017435 A | 12/1952 |
| WO | 2011073587 A1 | 6/2011 |

OTHER PUBLICATIONS

FR 1017435—english machine translation of specification.*

(Continued)

*Primary Examiner* — Tien Dinh
*Assistant Examiner* — Alexander V Giczy
(74) *Attorney, Agent, or Firm* — Kinney & Lange, P.A.

(57) ABSTRACT

A ground propulsion assembly for an aircraft includes an axle, a wheel rotatably connected to the axle, and a transmission. The transmission includes a housing mounted proximate the axle and a drive element disposed at least partially outside of the housing and operatively connected to a power input. A mounting bar extends between the axle and the transmission and a mounting bar first end is rigidly connected to the axle, and the transmission is pivotally connected to a mounting bar second end. A spring is disposed between the transmission and the axle and the spring is configured to urge the drive element out of engagement with the wheel. An actuator is operatively connected between the transmission and the axle, and is configured to selectively generate a force in opposition to the disengagement spring such that the drive element moves relative the wheel and operatively engages the wheel.

9 Claims, 3 Drawing Sheets

(56) References Cited

U.S. PATENT DOCUMENTS

| | | | |
|---|---|---|---|
| 2010/0147995 A1* | 6/2010 | Cros | B64C 25/405 244/50 |
| 2012/0138734 A1 | 6/2012 | Hissong | |
| 2012/0217340 A1 | 8/2012 | Essinger et al. | |
| 2012/0228921 A1* | 9/2012 | Essinger | B64C 25/405 301/6.2 |
| 2013/0026284 A1* | 1/2013 | Christensen | B64C 25/405 244/50 |
| 2013/0068885 A1* | 3/2013 | Onomichi | B64C 25/22 244/102 R |
| 2013/0200210 A1* | 8/2013 | Oswald | B64C 25/405 244/50 |
| 2014/0245853 A1* | 9/2014 | Didey | B64C 25/405 74/421 A |

OTHER PUBLICATIONS

WO 2011073587—english machine translation of specification.*
The European Search Report mailed Feb. 12, 2015 for European Application No. 14180617.4.

* cited by examiner

PASSIVE FAIL SAFE COUPLING MECHANISM

BACKGROUND

The present invention relates to ground propulsion assemblies for aircraft and more specifically to mechanisms for coupling and decoupling ground propulsion assemblies from aircraft wheels.

Typically, an aircraft is propelled and maneuvered on the ground during taxi either indirectly by a wheel tug pulling on a towbar connected to the front landing gear of the aircraft, or directly using the engines of the aircraft to propel the aircraft on the ground. Using a wheel tug and towbar to move and position the aircraft on the ground is inefficient because the aircraft is dependent on ground support personnel and equipment and often must wait until ground support is available. Using the engines on the aircraft to propel the aircraft on the ground is also undesirable as it is an inefficient use of relatively expensive jet engine fuel and poses a safety risk to ground personnel who must remain clear of engine exhaust flows. Furthermore, the aircraft cannot use its own engines to push itself backwards out of the gate as the blast created by the reverse thrust of the engines could damage terminal structures and/or kick up dust and debris that could be ingested by the engines and potentially damage the engines. Thus, an aircraft that uses its own engines to propel itself on the ground may still have to rely on a wheel tug, towbar, and ground personnel to move the aircraft out of the gate and to a safe distance away from the terminal.

Another alternative that has been used to propel an aircraft on the ground is to use an electric motor mechanically coupled to the wheels of the aircraft to power the wheels. During take-off and landing, the electric motor is mechanically decoupled from the wheels so that the wheels can spin freely without resistance from the electric motor and its accompanying mechanical components. Once the aircraft is on the ground and has decelerated on the runway, a clutch assembly is used to mechanically couple the electric motor with the wheels and propel the aircraft at low speeds on the ground. However, the clutch assembly typically employs a relatively complicated and expensive assembly of electromechanical actuators, linkages, and gears to mechanically couple and decouple the electric motor from the wheels. Furthermore, the clutch assembly is not sufficiently reliable as it is sensitive shock. The aircraft also would typically utilize expensive power electronics to control the speed and direction of the electronic motor.

SUMMARY

In one aspect, a ground propulsion assembly for an aircraft includes an axle, a wheel rotatably connected to the axle, and a transmission. The transmission includes a housing mounted proximate the axle and a drive element disposed at least partially outside of the housing and operatively connected to a power input. A disengagement spring is disposed between the transmission and the axle and the disengagement spring is configured to urge the drive element out of engagement with the wheel. An actuator is operatively connected between the transmission and the axle, the actuator being configured to selectively generate a force in opposition to the disengagement spring such that the drive element moves relative the wheel and operatively engages the wheel to transfer torque to the wheel.

In another aspect, a method for operating a ground propulsion assembly for an aircraft includes powering an electric motor connected to a housing of a hydraulic transmission, the housing being pivotally mounted to a wheel axle. A hydraulic line inside the housing is pressurized by operatively connecting the electric motor to a hydraulic pump. A drive element connected to an output of a hydraulic motor is rotated by fluidically connecting the hydraulic motor to the hydraulic line pressurized by the hydraulic pump. An actuator is operatively connected between the hydraulic transmission and the axle and is fluidically connected to the hydraulic line pressurized by the hydraulic pump. A disengagement spring is disposed between the hydraulic transmission and the axle and configured to urge the hydraulic transmission out of engagement with a wheel or tire connected to the axle. The actuator is pressurized such that the actuator generates a force in opposition to the disengagement spring such that the hydraulic transmission moves relative the wheel or tire and the drive element operatively engages the wheel or tire to transfer torque to the wheel or tire.

Persons of ordinary skill in the art will recognize that other aspects and embodiments of the present invention are possible in view of the entirety of the present disclosure, including the accompanying figures.

Figure 1A:
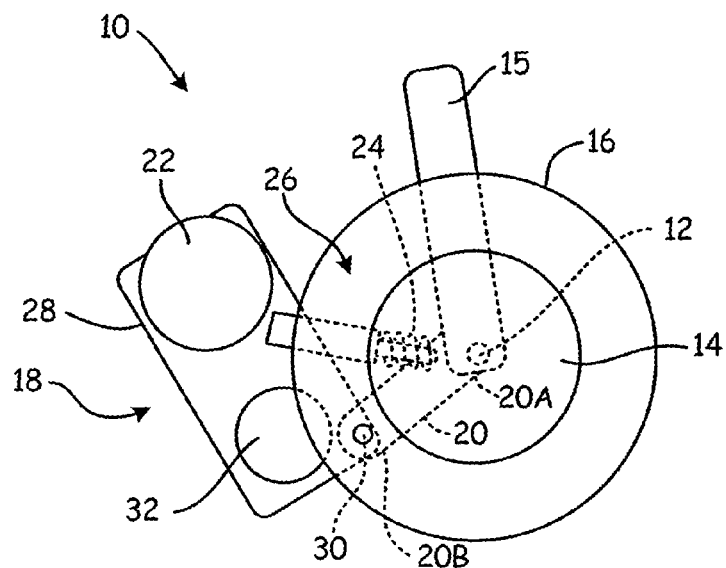
FIG. 1A is a side view of an embodiment of an aircraft wheel and ground propulsion assembly in a disengaged position.

While the above-identified drawing figures set forth one or more embodiments of the invention, other embodiments are also contemplated. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

The invention relates to an aircraft ground propulsion assembly that includes a hydraulic transmission to power at least one wheel of the aircraft. One or more embodiments of the invention can be configured as follows. The transmission is mounted to an axle of the wheel and moves relative the wheel. A drive element is mounted on the outside of the transmission and to a rotational output of the transmission. A disengagement spring is disposed between the transmission and the axle of the wheel and is configured to urge the transmission away from the wheel. An actuator is operatively connected between the transmission and the axle and fluidically connected to the transmission. When the transmission is hydraulically pressurized, the actuator generates a force in opposition to the disengagement spring such that the transmission moves towards the wheel and the drive element operatively engages the wheel to transfer torque to the wheel.

When the transmission is deactivated, both the transmission and the actuator are hydraulically depressurized and the disengagement spring urges the transmission and drive element away from the wheel.

Figure 1B:
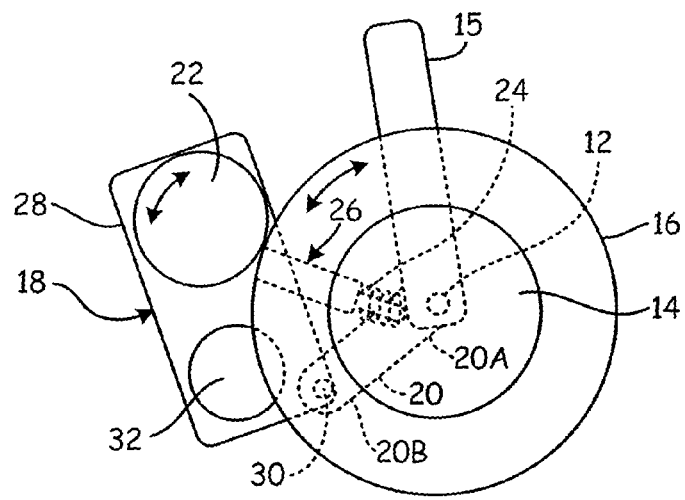
FIG. 1B is a side view of the aircraft wheel and ground propulsion assembly from FIG. 1A in an engaged position.

FIGS. 1A and 1B will be discussed concurrently. FIG. 1A is a side view of one embodiment of ground propulsion assembly 10 in a disengaged position relative wheel 14 of a vehicle, such as an aircraft, wheel 14 being rotatably connected to axle 12. FIG. 1B is a side view of wheel 14 and ground propulsion assembly 10 from FIG. 1A in an engaged position. Portions of ground propulsion assembly 10 hidden by wheel 14 are shown in phantom. Ground propulsion assembly 10 is configured to propel the aircraft while on the ground during taxi by rotating wheel 14. Suspension element 15 connects axle 12 and wheel 14 to the aircraft. As shown in FIGS. 1A and 1B, tire 16 is disposed around wheel 14 and ground propulsion assembly 10 further includes transmission 18, mounting bar 20, drive element 22, spring 24, and actuator 26. Transmission 18 further includes housing 28, pivot joint 30, and motor 32.

Mounting bar 20 is configured to mechanically connect transmission 18 proximate axle 12. Mounting bar 20 extends generally in a horizontal direction from axle 12 and includes first end 20A opposite second end 20B. First end 20A of mounting bar 20 can be rigidly or rotatably connected to axle 12. Housing 28 of transmission 18 can be pivotally connected to second end 20B of mounting bar 20 by pivot joint 30.

Transmission 18 can be a hydraulic transmission with motor 32 (e.g., an electric motor) serving as a power input that drives the pressurization of transmission 18. Motor 32 can be electrically connected to and powered by an auxiliary power unit (not shown) of the aircraft. Drive element 22 is disposed at least partially outside of housing 28 of transmission 18 and is operatively connected to motor 32 by way of suitable mechanisms and/or gearing of transmission 18. As shown by way of illustration and not by way of limitation, drive element 22 can be a friction wheel configured to directly engage tire 16 of wheel 14. When motor 32 of transmission 18 is powered off, spring 24, which can be operatively disposed between transmission 18 and axle 12, exerts a force between transmission 18 and axle 12 to urge transmission 18 and drive element 22 into a disengaged position away from wheel 14 and tire 16, as shown in FIG. 1A. When transmission 18 and drive element 22 are in the disengaged position, tire 16 and wheel 14 can rotate at high speeds, such as the speeds encountered during take-off and landing, without meeting any resistance from transmission 18 and drive element 22. While in the disengaged position, drive element 22 and transmission 18 are also protected from shocks and bumps encountered by wheel 14 and tire 16 because drive element 22 and transmission 18 are not in direct contact with tire 16 or wheel 14.

Actuator 26 can be operatively connected between transmission 18 and mounting bar 20. As shown in FIG. 1B, actuator 26 is configured to selectively generate a force in opposition to spring 24 such that drive element 22 pivots with transmission 18 toward wheel 14 to an engaged position where drive element 22 directly engages tire 16 of wheel 14 to transfer torque to wheel 14. As shown by way of example and not by way of limitation in FIG. 1B, spring 24 can be a helical compression spring and actuator 26 can be a hydraulic ram piston that compresses spring 24 to bring drive element 22 and transmission 18 into the engaged position. As described in greater detail below with reference to FIG. 2, actuator 26 can be fluidically coupled to transmission 18 and can be activated simultaneously with drive element 22 when motor 32 is activated to pressurize transmission 18. Correspondingly, actuator 26 can be deactivated simultaneously with drive element 22 by deactivating motor 32. When motor 32 is deactivated, actuator 26 no longer resists and opposes spring 24, thereby allowing spring 24 to passively move transmission 18 and drive element 22 to the disengaged position. As described below with reference to FIG. 2, transmission 18 can be a hydrostatic transmission that can selectively provide torque to wheel 14 and tire 16 in clockwise and counterclockwise directions.

Figure 2:
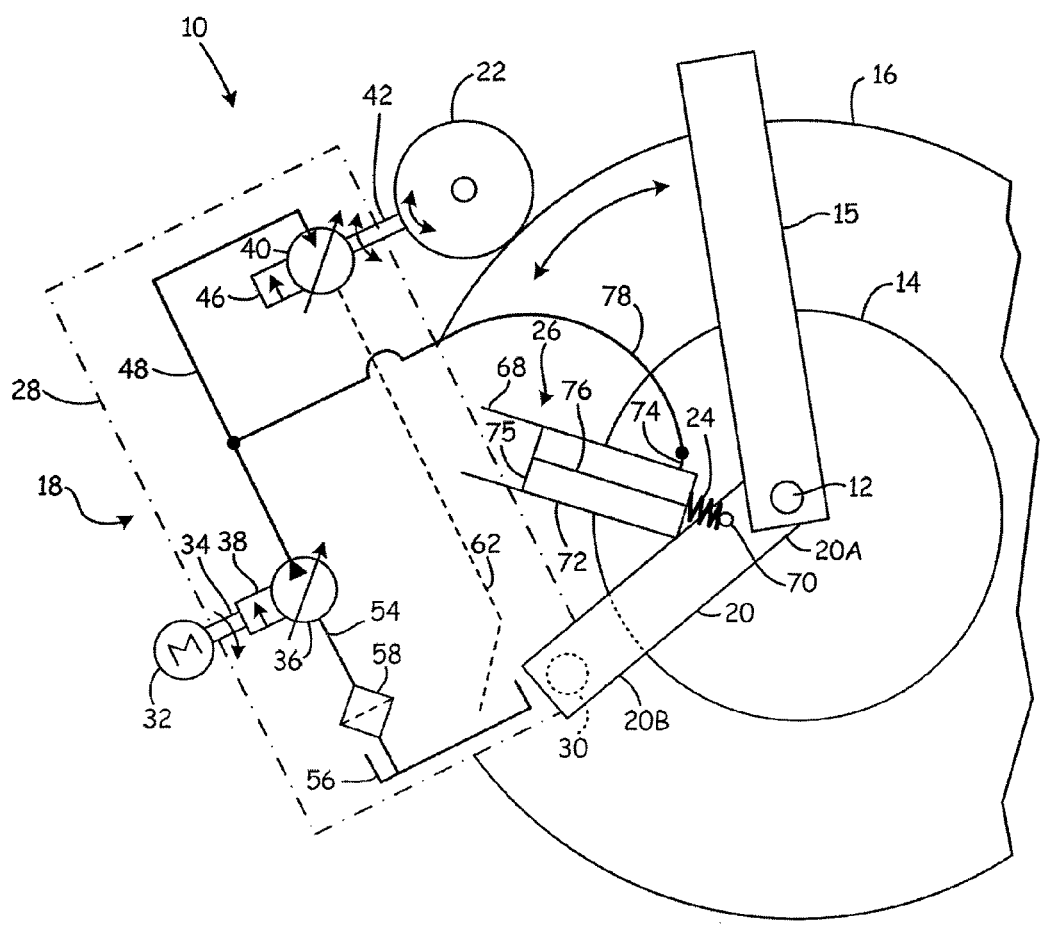
FIG. 2 is a schematic diagram of the wheel and ground propulsion assembly from FIG. 1A in an engaged position.

FIG. 2 is a schematic diagram of ground propulsion assembly 10 from FIG. 1A. In FIG. 2, ground assembly 10 is shown in the engaged position. As shown by way of example and not by limitation, transmission 18 can be a hydrostatic transmission. Along with the elements described above with reference to FIGS. 1A and 1B, transmission 18 can further include output shaft 34 of motor 32, hydraulic pump 36 with first swash plate 38, hydraulic motor 40 with output shaft 42 and second swash plate 46, and fluid line 48. Transmission 18 can also include inlet line 54, reservoir 56, filter 58, and drain 62.

Hydraulic pump 36 can be disposed within housing 28 of transmission 18 and can be mechanically connected to and powered by output shaft 34 of motor 32. Hydraulic pump 36 can be a pressure compensated variable-displacement pump that uses first swash plate 38 to maintain a pressure output. Hydraulic motor 40 can also be disposed within housing 28 of transmission 18 and can be fluidically connected to hydraulic pump 36 by fluid line 48. Output shaft 42 of hydraulic motor 40 can extend through housing 28 of transmission 18 to mechanically connect with and provide power to drive element 22. Hydraulic motor 40 can be a variable-displacement hydraulic piston motor as shown in FIG. 2. Second swash plate 46 controls the speed and rotational direction of hydraulic motor 40. Because hydraulic motor 40 can be a variable-displacement hydraulic motor, hydraulic motor 40 can be actuated in both a forward or reverse direction to move drive element 22 in a forward or reverse direction (i.e., clockwise or counterclockwise). As shown in FIG. 2, hydraulic pump 36 can pump hydraulic fluid across hydraulic motor 40 via fluid line 48 to actuate hydraulic motor 40 in a forward direction or a reverse direction depending on the orientation of second swash plate 46. Hydraulic motor 40 then rotates drive element 22 which in turn rotates tire 16 and wheel 14 in the opposite direction of hydraulic motor 40 and drive element 22. While hydraulic motor 40 can operate in both forward and reverse directions, motor 32 and hydraulic pump 36 need only provide output in one direction. Though not shown in FIG. 2, persons of ordinary skill in the art will recognize that rotational reduction means can be mechanically connected between output shaft 42 of hydraulic motor 40 and drive element 22 so as to adjust the rotational speed at which hydraulic motor 40 turns drive element 22. The rotational reduction means can be selected from a group of components comprising belts, pulleys, chains, and gears.

Reservoir 56 can be disposed within housing 28 of transmission 18 and can be fluidically connected to hydraulic pump 36 by inlet line 54 to provide hydraulic fluid to hydraulic pump 36. Filter 58 can be fluidically connected on inlet line 54 between hydraulic pump 36 and reservoir 56 to help prevent debris from flowing into hydraulic pump 36 and the fluid circuit between hydraulic pump 36 and hydraulic motor 40. Drain 62 can be connected between reservoir 56 and hydraulic motor 40 to direct hydraulic fluid exiting hydraulic motor 40 back to reservoir 56.

As shown in FIG. 2 and previously described above with reference to FIG. 1, actuator 26 can be configured as a hydraulic ram piston. Actuator 26 extends between first end 68 and second end 70. Along with being a hydraulic ram piston, actuator 26 can be a single-acting cylinder that includes cylindrical tube 72 with inlet 74, piston 75, and piston rod 76. Hose 78 (or another suitable hydraulic connection) extends between transmission 18 and actuator 26 and fluidically connects actuator 26 to transmission 18.

At first end 68 of actuator 26, cylindrical tube 72 is connected to housing 28 of transmission 18. Piston 75 is disposed inside cylindrical tube 72, and piston rod 76 extends from piston 75 and at least partially out of cylindrical tube 72. At second end 70 of actuator 26, piston rod 76 is connected to mounting bar 20 opposite piston 75. As shown in FIG. 2, spring 24 can be disposed around and encircling piston rod 76 and operatively connected between mounting bar 20 and cylindrical tube 72 of actuator 26, with spring 24 exerting a compressive force against mounting bar 20 and cylindrical tube 72. In alternate embodiments, spring 24 could be a torsion spring, leaf spring, or a pneumatic spring, and could be arranged in alternate positions on actuator 26 that allow spring 24 to exert a compressive force on or within actuator 26. As shown in FIG. 2, inlet 74 is formed in cylindrical tube 72 and hose 78 can be connected between inlet 74 and fluid line 48. Hose 78 fluidically connects actuator 26 to the fluid circuit between hydraulic pump 36 and hydraulic motor 40 such that actuator 26 receives hydraulic fluid from hydraulic pump 36 and is pressurized by hydraulic pump 36 during operation.

During operation, motor 32 is activated and drives hydraulic pump 36. Hydraulic pump 36 forces pressurized hydraulic fluid across hose 78, through inlet 74, and into cylindrical tube 72. As hydraulic fluid accumulates inside cylindrical tube 72, piston 75 is pushed towards first end 68 of actuator 26. As piston 75 migrates towards first end 68 of actuator 26, piston 75 pulls piston rod 76 with it towards first end 68 thereby decreasing an overall length of actuator 26. As the overall length of actuator 26 decreases, actuator 26 compresses spring 24 and causes transmission 18 and drive element 22 to pivot on pivot joint 30 towards wheel 14 and tire 16 such that drive element 22 engages tire 16 and transfers torque to wheel 14. When motor 32 is deactivated, hydraulic pump 36 stops and ceases to apply pressure to the hydraulic fluid in actuator 26. Because the hydraulic fluid in actuator 26 is no longer pressurized by hydraulic pump 36, the compressive force exerted by spring 24 against cylindrical tube 72 drives the hydraulic fluid out of cylindrical tube 72 and causes piston 75 to migrate in the direction of second end 70 of actuator 26. As piston 75 migrates in the direction of second end 70, the length of actuator 26 increases and causes transmission 18 and drive element 22 to pivot on pivot joint 30 away from wheel 14 and tire 16 to the disengaged position. The above description in reference to FIG. 2 is given by way of example only and not by way of limitation. As shown below in FIGS. 3 and 4, ground propulsion assembly 10 can be varied and modified without departing the scope of the invention.

Figure 3:
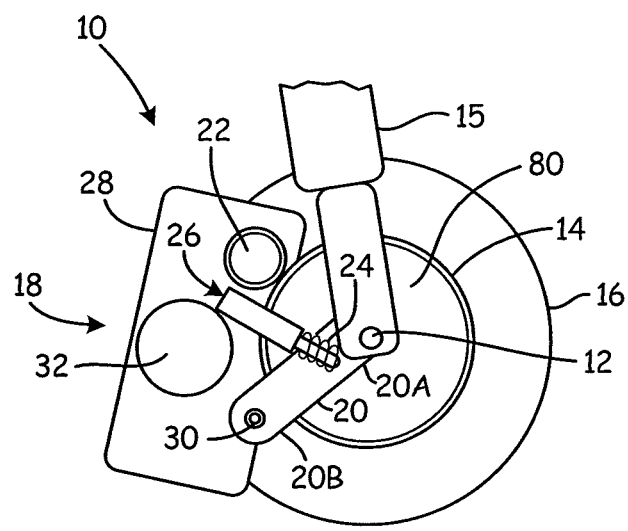
FIG. 3 is a side view of another embodiment of the aircraft wheel and ground propulsion assembly with a wheel removed.
Figure 4:
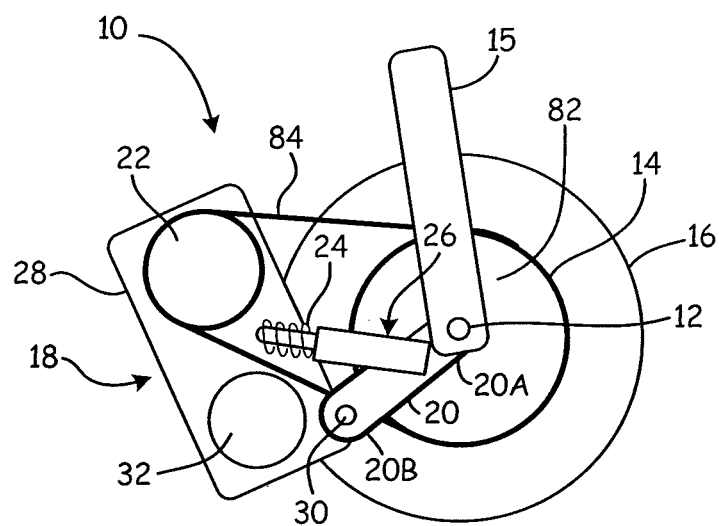
FIG. 4 is a side view of yet another embodiment of the aircraft wheel and ground propulsion assembly with a wheel removed.

FIGS. 3 and 4 will be discussed concurrently. FIG. 3 is a side view of another embodiment of ground propulsion assembly 10. FIG. 4 is a side view of yet another embodiment of ground propulsion assembly 10. As shown in FIG. 3, drive element 22 can be a first gear configured to engage second gear 80 that is mounted coaxial with and rotationally coupled to wheel 14. Drive element 22 and second gear 80 can be gears with teeth that mesh, or they can be friction gears that rely on the friction between their two circumferential faces to transfer torque. Aside from drive element 22 being a first gear that engages second gear 80, transmission 18 and actuator 24 can function as described above with reference to FIGS. 1A-2. When drive element 22 is in an engaged position, transmission 18 rotates drive element 22 which rotates second gear 80. Because second gear 80 is mounted coaxial with wheel 14, wheel 14 rotates as drive element 22 rotates second gear 80.

As shown in FIG. 4, drive element 22 can be a first pulley, and second pulley 82 is mounted coaxial with and rotationally coupled to wheel 14. Belt 84 is disposed around drive element 22 and second pulley 82. Spring 24 can be a tension spring that pulls transmission 18 and actuator 24 towards wheel 14 and second pulley 82 to a disengagement position such that belt 84 is too slack to transfer torque between drive element 22 and second pulley 82 when electrical motor 32 is deactivated. During operation of transmission 18 and electrical motor 32, actuator 24 becomes pressurized and exerts a compressive force that counteracts spring 24 and pushes transmission 18 and drive element 22 away from wheel 14 and second pulley 82, and pushes drive element 22 against belt 84 such that belt 84 is taut and able to transfer torque between drive element 22 and second pulley 82. Because second pulley 82 is mounted coaxial with wheel 14, wheel 14 rotates as drive element 22 rotates second pulley 82.

Possible Benefits

Persons of ordinary skill in the art will recognize that ground propulsion assembly 10 of the present invention can provide numerous advantages and benefits. Some examples of those advantages and benefits are as follows. Ground propulsion assembly 10 provides transmission 18, actuator 24, and spring 24, which are configured to function together as a passive, fail-safe coupling mechanism between drive element 22 and wheel 14. Because both actuator 24 and drive element 22 are hydraulically coupled to transmission 18 and are activated and deactivated simultaneously when motor 32 of transmission 18 is activated and deactivated, spring 24 is generally able to passively push drive element 22 out of engagement with wheel 14 whenever transmission 18 and drive element 22 are intentionally deactivated or are deactivated as a result of some kind of unintentional failure. Because spring 24 is generally able to passively move drive element 22 to the disengaged position whenever transmission 18 and motor 32 are deactivated, ground propulsion assembly 10 minimizes that risk of transmission 18 failing and drive element 22 being stuck in the engaged position where the speeds encountered by wheel 14 during take-off or landing would destroy transmission 18 and possibly create a flying debris hazard. Furthermore, ground propulsion assembly 10 does not utilize expensive power electronics and is relatively simple compared to prior art assemblies that use complex electro-mechanical clutches.

Discussion of Possible Embodiments

The following are non-exclusive descriptions of possible embodiments of the present invention.

In one embodiment, a ground propulsion assembly for an aircraft includes an axle, a wheel rotatably connected to the axle, and a transmission. The transmission includes a housing mounted proximate the axle and a drive element disposed at least partially outside of the housing and operatively connected to a power input. A disengagement spring is disposed between the transmission and the axle and the disengagement spring is configured to urge the drive element out of engagement with the wheel. An actuator is operatively connected between the transmission and the axle, the actuator being configured to selectively generate a force in opposition to the disengagement spring such that the drive element moves relative the wheel and operatively engages the wheel to transfer torque to the wheel.

The assembly of the preceding paragraph can optionally include, additionally and/or alternatively, any one or more of the following features, configurations and/or additional components:

the drive element and the transmission are configured to pivot toward the wheel.

the transmission is a hydrostatic transmission further comprising an electric motor, a pressure compensated pump connected to the electric motor, and a variable displacement hydraulic motor fluidically connected to the pressure compensated pump;

the drive element is connected to an output shaft of the variable displacement hydraulic motor;

the actuator is a hydraulic ram piston extending between the transmission and the axle and fluidically connected to the pressure compensated pump, and wherein the pressure compensated pump actuates the hydraulic ram piston to selectively generate a force in opposition to the disengagement spring such that the transmission pivots and the drive element operatively engages the wheel to transfer torque to the wheel;

a mounting bar extends between the axle and the transmission and a first end of the mounting bar is rigidly connected to the axle and the transmission is pivotally connected to a second end of the mounting bar;

the hydraulic ram piston has a first end connected to the housing of the transmission and a second end connected to the mounting bar;

the hydraulic ram piston includes a cylindrical tube connected to the housing of the transmission, a piston disposed in the cylindrical tube, and a piston rod extending from the piston and at least partially out of the cylindrical tube, the piston rod being connected to the mounting bar opposite the piston;

the disengagement spring is disposed around the piston rod and operatively connected between the mounting bar and the cylindrical tube of the hydraulic ram piston;

the drive element is a friction wheel configured to directly engage a tire disposed around the wheel;

the drive element is a first gear configured to engage a second gear that is coaxial with the wheel;

the drive element is a first pulley configured to engage a second pulley that is coaxial with the wheel; and/or a belt is disposed around the first pulley and the second pulley, and the actuator is configured to selectively generate a force in opposition to the disengagement spring such that the transmission pivots and moves the first pulley into the engaged position where the first pulley engages the belt to transfer torque from the first pulley to the second pulley.

In another embodiment, a method for operating a ground propulsion assembly for an aircraft includes powering an electric motor connected to a housing of a hydraulic transmission, the housing being pivotally mounted to a wheel axle. A hydraulic line inside the housing is pressurized by operatively connecting the electric motor to a hydraulic pump. A drive element connected to an output of a hydraulic motor is rotated by fluidically connecting the hydraulic motor to the hydraulic line pressurized by the hydraulic pump. An actuator is operatively connected between the hydraulic transmission and the axle and is fluidically connected to the hydraulic line pressurized by the hydraulic pump. A disengagement spring is disposed between the hydraulic transmission and the axle and configured to urge the hydraulic transmission out of engagement with a wheel connected to the axle. The actuator is pressurized such that the actuator generates a force in opposition to the disengagement spring such that the hydraulic transmission moves relative the wheel and the drive element operatively engages the wheel to transfer torque to the wheel.

The method of the preceding paragraph can optionally include, additionally and/or alternatively, any one or more of the following steps, features, and/or configurations:

the drive element is operatively disengaged from the wheel by cutting electrical power to the electric motor thereby stopping the hydraulic pump from pressurizing the hydraulic line and the actuator, thus allowing disengagement spring to urge the hydraulic transmission and the drive element out of engagement with the wheel.

Summation

Any relative terms or terms of degree used herein, such as "substantially", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, transitory vibrations and sway movements, temporary alignment or shape variations induced by operational conditions, and the like.

While the invention has been described with reference to an exemplary embodiment(s), it will be understood by those skilled in the art that various changes may be made and equivalents may be substituted for elements thereof without departing from the scope of the invention. For example actuator 26 could also be an electro-mechanical actuator, such as a DC brush motor connected to a ball screw. Motor 32 can be an AC motor. When electric power is connected to motor 32 (AC power) a rectifier could be utilized to create DC power, which would be directly connected to the brushed dc motor, causing it to produce torque, which would pass through the ball screw, producing force to counteract the disengagement spring. Alternately, actuator 26 can be an induction motor which would use AC power in circuit with motor 32. In both of these examples, both embodiments of actuator 26 would passively disengage or engage drive element 22, much the same way as a hydraulic ram would, when connected to the hydrostatic transmission. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A ground propulsion assembly for an aircraft, the assembly comprising:
an axle;
a wheel rotatably connected to the axle;
a transmission comprising:
   a housing mounted proximate the axle; and
   a drive element disposed at least partially outside of the housing;
a power input connected to the housing of the transmission and operatively connected to the drive element;
a mounting bar extending between the axle and the transmission, wherein a first end of the mounting bar is rigidly connected in an immobile manner to the axle and the transmission is pivotally connected to a second end of the mounting bar;

a disengagement spring disposed between the transmission and the axle, wherein the disengagement spring is configured to urge the drive element out of engagement with the wheel; and an actuator operatively connected between the transmission and the axle, wherein the actuator is configured to selectively generate a force in opposition to the disengagement spring such that the drive element moves relative the wheel and operatively engages a surface of the wheel to transfer torque to the wheel.

2. The assembly of claim 1, wherein the drive element and the transmission are configured to pivot toward the wheel.

3. The assembly of claim 1, wherein the power input is an electric motor and wherein the transmission is a hydrostatic transmission that further comprising:

a pressure compensated pump connected to the electric motor; and a variable displacement hydraulic motor fluidically connected to the pressure compensated pump.

4. The assembly of claim 3, wherein the drive element is connected to an output shaft of the variable displacement hydraulic motor.

5. The assembly of claim 4, wherein the actuator is a hydraulic ram piston extending between the transmission and the axle and fluidically connected to the pressure compensated pump, and wherein the pressure compensated pump actuates the hydraulic ram piston to selectively generate the force in opposition to the disengagement spring such that the transmission pivots and the drive element operatively engages the wheel to transfer torque to the wheel.

6. The assembly of claim 5, wherein the hydraulic ram piston has a first end connected to the housing of the transmission and a second end connected to the mounting bar.

7. The assembly of claim 6, wherein the hydraulic ram piston comprises:

a cylindrical tube connected to the housing of the transmission;

a piston disposed in the cylindrical tube; and a piston rod extending from the piston and at least partially out of the cylindrical tube, wherein the piston rod is connected to the mounting bar opposite the piston.

8. The assembly of claim 7, wherein the disengagement spring is disposed around the piston rod and operatively connected between the mounting bar and the cylindrical tube of the hydraulic ram piston.

9. The assembly of claim 1, wherein the drive element is a friction wheel configured to directly engage a tire disposed around the wheel.

* * * * *